(12) United States Patent
Lyu et al.

(10) Patent No.: US 11,504,802 B2
(45) Date of Patent: Nov. 22, 2022

(54) MULTIFUNCTIONAL LASER PROCESSING APPARATUS

(71) Applicant: METAL INDUSTRIES RESEARCH & DEVELOPMENT CENTRE, Kaohsiung (TW)

(72) Inventors: Yu-Ting Lyu, Kaohsiung (TW); Hsiang-Pin Wang, Kaohsiung (TW); Po-Chi Hu, Kaohsiung (TW); Chao-Yung Yeh, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 420 days.

(21) Appl. No.: 16/701,089

(22) Filed: Dec. 2, 2019

(65) Prior Publication Data
US 2020/0180070 A1  Jun. 11, 2020

(30) Foreign Application Priority Data
Dec. 3, 2018 (TW) .................................. 107143275

(51) Int. Cl.
*B23K 26/00* (2014.01)
*B23K 26/06* (2014.01)
(Continued)

(52) U.S. Cl.
CPC ........ *B23K 26/0093* (2013.01); *B23K 26/034* (2013.01); *B23K 26/0643* (2013.01);
(Continued)

(58) Field of Classification Search
CPC ............ B23K 26/0093; B23K 26/0643; B23K 26/354; B23K 26/382; B23K 26/60; B23K 28/02
See application file for complete search history.

(56) References Cited

U.S. PATENT DOCUMENTS

| 7,257,879 B1 * | 8/2007 | Jancso | ............... B23K 26/0093 219/121.75 |
| 2016/0101492 A1 * | 4/2016 | Chuang | .............. B23K 26/0093 409/136 |
| 2018/0141174 A1 * | 5/2018 | Mori | ..................... B23K 26/342 |

FOREIGN PATENT DOCUMENTS

| CN | 107962097 A * | 4/2018 | ............. B21D 22/02 |
| DE | 102009058254 A1 * | 9/2010 | ......... B23K 26/0652 |

(Continued)

*Primary Examiner* — John J Norton
(74) *Attorney, Agent, or Firm* — CKC & Partners Co., LLC

(57) ABSTRACT

A multifunctional laser processing apparatus includes a hollow milling shaft, a light path tool holder, a tool-holder-type melting module, a laser light source, and a temperature sensor. The hollow milling shaft includes a first light path channel and a connection portion. The light path tool holder can be connected to the connection portion. The light path tool holder has a second light path channel communicating with the first light path channel. The tool-holder-type melting module can be connected to the connection portion. The tool-holder-type melting module has a third light path channel communicating with the first light path channel. The laser light source is configured to emit a laser light beam toward the first light path channel. The temperature sensor is disposed on an outer surface of the hollow milling shaft and is configured to sense a temperature of a work piece during a multifunctional processing process.

8 Claims, 3 Drawing Sheets

(51) Int. Cl.
*B23K 26/70* (2014.01)
*B23K 26/03* (2006.01)
*B23K 26/382* (2014.01)
*B23K 26/354* (2014.01)
*B23P 23/04* (2006.01)
*B23P 25/00* (2006.01)
*B23K 26/14* (2014.01)
*B23K 26/342* (2014.01)

(52) U.S. Cl.
CPC ........ *B23K 26/1464* (2013.01); *B23K 26/342* (2015.10); *B23K 26/354* (2015.10); *B23K 26/382* (2015.10); *B23K 26/707* (2015.10); *B23P 23/04* (2013.01); *B23P 25/006* (2013.01)

(56) References Cited

FOREIGN PATENT DOCUMENTS

| TW | I232144 B | 5/2005 |
| TW | 201117905 A | 6/2011 |
| TW | 201521932 A | 6/2015 |

* cited by examiner

US 11,504,802 B2

MULTIFUNCTIONAL LASER PROCESSING APPARATUS

RELATED APPLICATIONS

This application claims priority to Taiwan Application Serial Number 107143275, filed Dec. 3, 2018, which is herein incorporated by reference.

BACKGROUND

Field of Invention

The present invention relates to a processing apparatus, and more particularly, to a multifunctional laser processing apparatus.

Description of Related Art

A laser has a property that can rapidly rise a temperature of a surface of a material without affecting the material. A laser assisted processing technique is a common precision processing technique, and is mainly applied on materials that are difficultly finished in a mold industry, an aerospace industry, a medical industry, and etc., such as ceramic materials and superalloys that are hard to be directly cut.

Purdue University in America provides a laser processing assisted turning device. After a material to be processed is heated and melted by using the laser processing assisted turning device, the heated and melted material is then processed by using a cutting tool to cut and remove a portion of the heated and melted material. However, a heated area formed in the material by the laser and the cutting tool are not at the same location, such that the laser processing assisted turning device is only applicable to a turning processing device.

DaimlerChrysler AG Company installs a laser processing device on a machine tool. A laser can follow a cutting route to maintain a stable temperature field by using a multiple degrees of freedom rotation device and a route plan. A heated area formed in a processed material by the laser is shifted from a cutting tool by a certain distance. The heated area formed by the laser of the processing device and the cutting tool are not at the same location, such that misheated areas are easily formed in the curve route to deform the material in a non-processed scope, and an area to be processed is not heated by the laser. Accordingly, the machine tool only has a cut processing function and is geometry limited in practical application. In addition, the machine tool easily causes a temperature difference due to rapid change between hot and cold.

Jenoptik Company in Germany provides a device including a laser light source in a processing shaft and a hollow cutting tool, such that the device can remove the material by laser processing and cut processing. However, the device only has a cut processing function. In addition, a bottom of the hollow cutting tool does not have any cutting blade, such that the device cannot effectively process and cannot be applied on curve surface processing.

SUMMARY

Therefore, one object of the present invention is to provide a multifunctional laser processing apparatus, in which a hollow milling shaft has a light path channel, such that laser assisted subtractive processing can be performed on a high temperature alloy or a ceramic material by using a single laser light source, thereby decreasing cutting force and extending life of a cutting tool. In addition, the laser light source may be used to perform cladding additive manufacturing on the high temperature alloy. With the laser, the tool-holder-type melting module, and a powder-feeding system, one single processing apparatus can be used to perform an additive and subtractive complex process on a work piece.

Another objective of the present invention is to provide a multifunctional laser processing apparatus, which can perform an additive and subtractive complex process on a work piece, such that the multifunctional laser processing apparatus can apply processing functions on the work piece in different paths in the same mechanical coordinate, thereby enhancing processing accuracy and quality.

According to the aforementioned objectives, the present invention provides a multifunctional laser processing apparatus, which is suitable to perform a multifunctional processing process on a work piece. The multifunctional laser processing apparatus includes a hollow milling shaft, a light path tool holder, a tool-holder-type melting module, a laser light source, and a temperature sensor. The hollow milling shaft has a first light path channel, in which the hollow milling shaft includes a connection portion. The light path tool holder is configured to be connected to the connection portion of the hollow milling shaft, in which the light path tool holder has a second light path channel, and the second light path channel communicates with the first light path channel. The tool-holder-type melting module is configured to be connected to the connection portion of the hollow milling shaft, in which the tool-holder-type melting module has a third light path channel, and the third light path channel communicates with the first light path channel. The laser light source is configured to emit a laser light beam toward the first light path channel of the hollow milling shaft. The temperature sensor is disposed on an outer surface of the hollow milling shaft and is configured to sense a temperature of the work piece during the multifunctional processing process.

According to one embodiment of the present invention, the laser light source is a continuous laser light source.

According to one embodiment of the present invention, the light path tool holder includes an optical assembly disposed in the second light path channel, and the optical assembly is configured to guide the laser light beam.

According to one embodiment of the present invention, the optical assembly includes a beam splitter, a first reflector, a second reflector, and a third reflector. The beam splitter is configured to split the laser light beam into a first laser light beam and a second laser light beam. The first reflector is configured to reflect the first laser light beam transmitted from the beam splitter to the work piece. The second reflector is configured to reflect the second laser light beam transmitted from the beam splitter. The third reflector is configured to reflect the second laser light beam reflected by the second reflector splitter to the work piece.

According to one embodiment of the present invention, the beam splitter is a pellicle mirror.

According to one embodiment of the present invention, the tool-holder-type melting module further has at least one feeding hole, and the at least one feeding hole passes through a sidewall of the third light path channel to communicate with the third light path channel.

According to one embodiment of the present invention, the at least one feeding hole is configured to be connected to an external feeding system, such that the external feed system can feed the third light path channel through the at least one feeding hole.

According to one embodiment of the present invention, the multifunctional laser processing apparatus further includes at least one feeding hole connected to an external feeding system, and a discharge port of the at least one feeding hole is directly toward the work piece.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
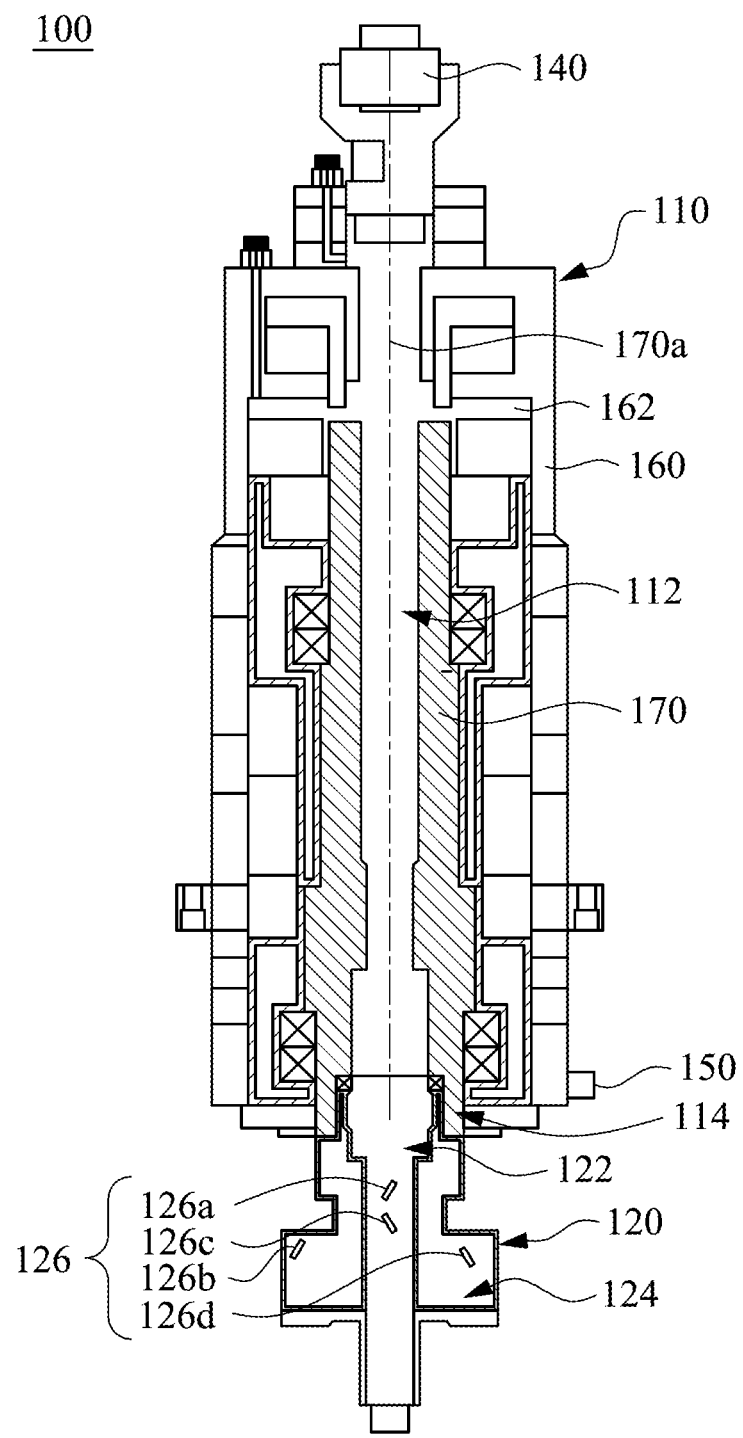
FIG. 1 is a schematic diagram of a multifunctional laser processing apparatus in accordance with one embodiment of the present invention.
Figure 2:
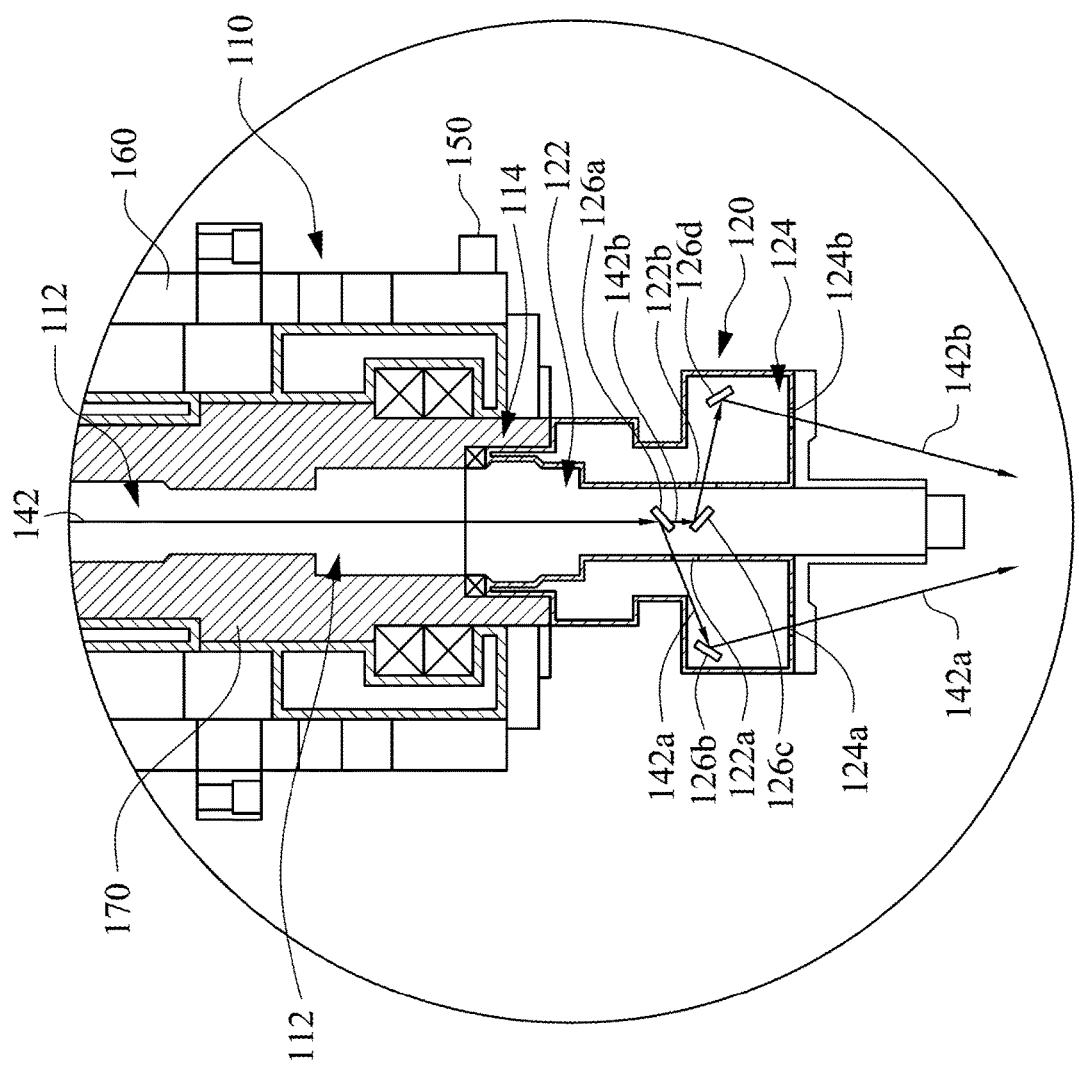
FIG. 2 is a schematic diagram of partial enlargement of a multifunctional laser processing apparatus in according to one embodiment of this invention.
Figure 3:
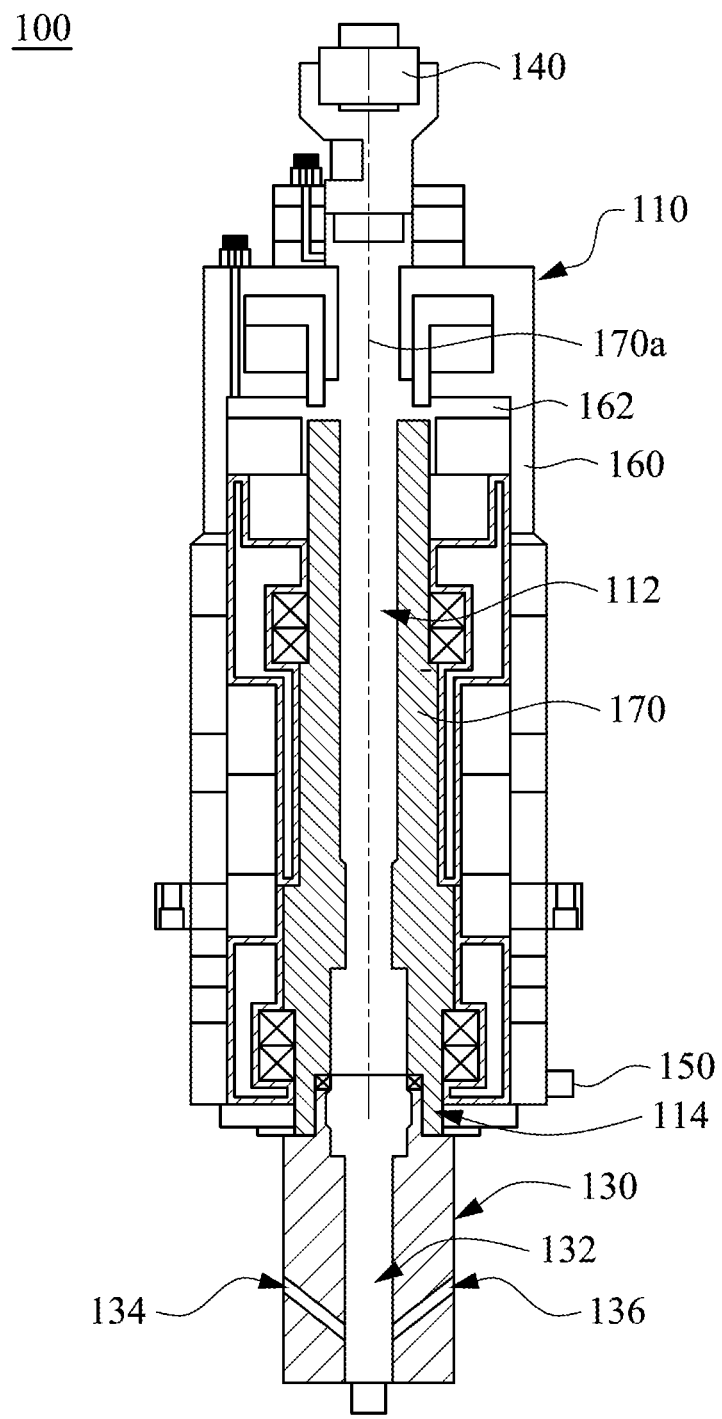
FIG. 3 is a schematic diagram of another multifunctional laser processing apparatus in accordance with one embodiment of the present invention.

Referring to FIG. 1 through FIG. 3, FIG. 1 through FIG. 3 are respectively a schematic diagram and a schematic diagram of partial enlargement of a multifunctional laser processing apparatus, and a schematic diagram of another multifunctional laser processing apparatus in accordance with one embodiment of the present invention. A multifunctional laser processing apparatus 100 may be used to a laser processing process, including a laser assisted milling subtractive processing process and a laser cladding additive processing process, on a work piece. In some embodiments, the multifunctional laser processing apparatus 100 may mainly include a hollow milling shaft 110, a light path tool holder 120, a tool-holder-type melting module 130, a laser light source 140, and a temperature sensor 150.

In some examples, as shown in FIG. 1, the hollow milling shaft 110 may include a shaft housing 160 and a spindle 170. The shaft housing 160 gas an accommodation space 162. The spindle 170 is disposed in the accommodation space 162. The spindle 170 has an axis 170a along its length direction. In some examples, the spindle 170 may use the axis 170a as a rotation axis and may be rotatably disposed in the accommodation space 162 of the shaft housing 160. The hollow milling shaft 110 has a first light path channel 112. The first light path channel 112 is located in the spindle 170 and extends along the axis 170a of the spindle 170 to pass through the spindle 170. For example, a material of the spindle 170 may be a steel material. The hollow milling shaft 110 includes a connection portion 114, which is located on end of the spindle 170.

The light path tool holder 120 may be used to perform a subtractive processing process on the work piece. The light path tool holder 120 may be disposed on the end of the spindle 170 of the hollow milling shaft 110 and may be connected to the connection portion 114. In addition, the light path tool holder 120 protrudes from one end of the hollow milling shaft 110. The light path tool holder 120 has a second light path channel 122. The second light path channel 122 of the light path tool holder 120 may extend along the axis 170a of the spindle 170 and may communicate with the first light path channel 112 of the hollow milling shaft 110.

Still referring to FIG. 1, the laser light source 140 may be disposed on the hollow milling shaft 110, and the laser light source 140 and the light path tool holder 120 are respectively located on two opposite sides of the hollow milling shaft 110. As shown in FIG. 2, the laser light source 140 may generate a laser light beam 142 and emit the laser light beam 142 toward the first light path channel 112 of the hollow milling shaft 110. In some exemplary examples, the laser light source 140 may be a continuous laser light source. The first light path channel 112 of the hollow milling shaft 110 communicates with the second light path channel 122 of the light path tool holder 120, such that the laser light beam 142 emitted toward the first light path channel 112 of the hollow milling shaft 110 by the laser light source 140 may be emitted to the second light path channel 122 through the first light path channel 112. In some examples, the laser light source 140 may directly focus on the work piece after passing through the second light path channel 122.

In some exemplary examples, the light path tool holder 120 may further have a chamber 124, in which the chamber 124 is located outside of the second light path channel 122. In these examples, as shown in FIG. 2, a first through hole 122a and a second through hole 122b are disposed in and pass through a sidewall of the second light path channel 122 of the light path tool holder 120, such that the second light path channel 122 can communicate with the chamber 124 via the first through hole 122a and the second through hole 122b. A first light-exiting opening 124a and a second light-exiting opening 124b are disposed in and pass through a bottom of the chamber 124. In addition, the light path tool holder 120 may further include an optical assembly 126, in which the optical assembly 126 is located in the second light path channel 122. In some examples, as shown in FIG. 1, the optical assembly 126 includes a beam splitter 126a, a first reflector 126b, a second reflector 126c, and a third reflector 126d. The beam splitter 126a may be disposed in the second light path channel 122 along the axis 170a of the spindle 170, the first reflector 126b and the third reflector 126d both are disposed in the chamber 124 and are respectively located at two opposite sides of the beam splitter 126a, and the second reflector 126c is disposed in the second light path channel 122 and is located under the beam splitter 126a. In some exemplary examples, the beam splitter 152 is a pellicle mirror. In such examples, locations of the first through hole 122a and the second through hole 122b of the second light path channel 122, and the first light-exiting opening 124a and the second light-exiting opening 124b of the chamber 124 respectively correspond to locations of the beam splitter 126a, the second reflector 126c, the first reflector 126b, and the third reflector 126d.

Referring to FIG. 1 and FIG. 2 continuously, in the example that the beam splitter 126a is a pellicle mirror, when the laser light beam 142 generated by the laser light source 140 is projected to the beam splitter 126a in the light path tool holder 120 through the first light path channel 112 of the hollow milling shaft 110, the beam splitter 126a reflects a portion of the laser light beam 142 to form a first laser light beam 142a, and the other portion of the laser light beam 142 passes through the beam splitter 126a to form a second laser light beam 142b. The first laser light beam 142a reflected by the beam splitter 126a is emitted to the first reflector 126b in the chamber 124 through the first through hole 122a of the second light path channel 122, and the first laser light beam 142a is further reflected to and emitted out through the first light-exiting opening 124a by the first reflector 126b to focus on the work piece. The second laser light beam 142b passing through the beam splitter 126a is emitted to the second reflector 126c under the beam splitter 126a, and the second laser light beam 142b is reflected to the third reflector 126d in the chamber 124 through the second through hole 122b of the second light path channel 122, and the second laser light beam 142b is then reflected to and emitted out through the second light-exiting opening 124b by the third reflector 126d to focus on the work piece. With the optical assembly 126, the multifunctional laser processing apparatus 100 can generate two laser light beams to emit on two sides of an area to be cut of the work piece, such that a uniform temperature field distribution is provided to the processing area.

When the multifunctional laser processing apparatus 100 is installed with the light path tool holder 120, the multifunctional laser processing apparatus 100 can perform a laser assisted subtractive processing process on a high temperature alloy or a ceramic material. The laser light beam 142 is focused on a preheat area of the work piece to be processed to melt the material of the work piece before cutting, such that cutting force is decreased, thereby extending life of a cutting tool.

In some examples, referring to FIG. 1 and FIG. 2 continuously, the temperature sensor 150 is disposed on an outer surface of the hollow milling shaft 110. The temperature sensor 150 may be used to sense a temperature of the area to be processed of the work piece during a multifunctional processing process, such as a laser assisted milling subtractive processing process and a laser cladding additive processing process. A worker may use a sense result provided by the temperature sensor 150 to determine whether the selected power of the laser light source 140 can achieve a temperature which can preheat the material of the work piece, or can achieve a temperature which can melt the material and cooperate to a powder-feeding pressure or not, such that the worker may adjust the laser light source 140 according to the sense result to maintain stability of processing.

The tool-holder-type melting module 130 may be connected to the connection portion 114 of the hollow milling shaft 110 and used to perform laser cladding additive processing on the work piece. For example, cladding additive manufacturing may be performed on a high temperature alloy material. Referring to FIG. 3, when a laser cladding additive processing process is performed, the light path tool holder 120 is removed from the connection portion 114 of the hollow milling shaft 110, and the tool-holder-type melting module 130 is then connected to the connection portion 114. The tool-holder-type melting module 130 has a third light path channel 132. The third light path channel 132 of the tool-holder-type melting module 130 may extend along the axis 170a of the spindle 170 and may communicate with the first light path channel 112 of the hollow milling shaft 110. The first light path channel 112 of the hollow milling shaft 110 communicate with the third light path channel 132 of the tool-holder-type melting module 130, such that the laser light beam 142 emitted by the laser light source 140 toward the first light path channel 112 of the hollow milling shaft 110 can be emitted to the third light path channel 132 through the first light path channel 112. The tool-holder-type melting module 130 further has one or more feeding holes 134 and 136, in which the feeding holes 134 and 136 pass through a sidewall 132s of the third light path channel 132 to communicate with the third light path channel 132. The feeding holes 134 and 136 of the tool-holder-type melting module 130 may be connected to an external feeding system, such that the external feed system can feed the third light path channel 132 through the feeding holes 134 and 136. In some examples, the feeding holes 134 and 136 of the tool-holder-type melting module 130 may be not connected to the third light path channel 132, and discharge ports of the feeding holes 134 and 136 are directly toward the work piece, such that the external feeding system directly feed the work piece through the feeding holes 134 and 136.

The temperature sensor 150 is disposed on the outer surface of the hollow milling shaft 110, such that when the hollow milling shaft 110 of the multifunctional laser processing apparatus 100 is installed with the light path tool holder 120 to performed a laser assisted milling subtractive processing process, or the tool-holder-type melting module 130 to perform a laser cladding additive processing process, the temperature sensor 150 can be used to sense the temperature of the work piece.

According to the aforementioned embodiments, one advantage of the present invention is that a hollow milling shaft of a multifunctional laser processing apparatus of the present invention has a light path channel, such that laser assisted subtractive processing can be performed on a high temperature alloy or a ceramic material by using a single laser light source, thereby decreasing cutting force and extending life of a cutting tool. In addition, the laser light source may be used to perform cladding additive manufacturing on the high temperature alloy. With the laser, the tool-holder-type melting module, and a powder-feeding system, one single processing apparatus can be used to perform an additive and subtractive complex process on a work piece.

According to the aforementioned embodiments, another advantage of the present invention is that a multifunctional laser processing apparatus of the present invention can perform an additive and subtractive complex process on a work piece, such that the multifunctional laser processing apparatus can apply processing functions on the work piece in different paths in the same mechanical coordinate, thereby enhancing processing accuracy and quality.

Although the present invention has been described in considerable detail with reference to certain embodiments thereof, the foregoing embodiments of the present invention are illustrative of the present invention rather than limiting of the present invention. It will be apparent to those having ordinary skill in the art that various modifications and variations can be made to the present invention without departing from the scope or spirit of the invention. Therefore, the spirit and scope of the appended claims should not be limited to the description of the embodiments contained herein.

What is claimed is:

1. A multifunctional laser processing system, which is suitable to perform a multifunctional processing process on a work piece, and the multifunctional laser processing apparatus comprising:
   a hollow milling shaft having a first light path channel, wherein the hollow milling shaft comprises a connection portion;
   a light path tool holder configured to be connected to the connection portion of the hollow milling shaft, wherein the light path tool holder has a second light path channel, and the second light path channel communicates with the first light path channel;
   a tool-holder-type melting module configured to be connected to the connection portion of the hollow milling shaft, wherein the tool-holder-type melting module has a third light path channel and at least one feeding hole, the third light path channel communicates with the first light path channel, and the at least one feeding hole is connected to an external feeding system;
a laser light source configured to emit a laser light beam toward the first light path channel of the hollow milling shaft; and
a temperature sensor disposed on an outer surface of the hollow milling shaft and configured to sense a temperature of the work piece during the multifunctional processing process,
wherein when the light path tool holder is connected to the connection portion, the laser light beam is emitted to the second light path channel through the first light path channel and is focused on the work piece, and
wherein when the tool-holder-type melting module is connected to the connection portion, the external feeding system feeds powders through the at least one feeding hole of the tool-holder-type melting module, and the laser light beam is emitted to the third light path channel through the first light path channel to perform a laser cladding additive processing process on the work piece.

2. The multifunctional laser processing system of claim 1, wherein the laser light source is a continuous laser light source.

3. The multifunctional laser processing system of claim 1, wherein the light path tool holder comprises an optical assembly disposed in the second light path channel, and the optical assembly is configured to guide the laser light beam.

4. The multifunctional laser processing system of claim 3, wherein the optical assembly comprises:
a beam splitter configured to split the laser light beam into a first laser light beam and a second laser light beam;
a first reflector configured to reflect the first laser light beam transmitted from the beam splitter to the work piece;
a second reflector configured to reflect the second laser light beam transmitted from the beam splitter; and
a third reflector configured to reflect the second laser light beam reflected by the second reflector to the work piece.

5. The multifunctional laser processing system of claim 4, wherein the beam splitter is a pellicle mirror.

6. The multifunctional laser processing system of claim 1, wherein the at least one feeding hole passes through a sidewall of the third light path channel to communicate with the third light path channel.

7. The multifunctional laser processing system of claim 6, wherein the external feeding system feeds the third light path channel with the powders through the at least one feeding hole.

8. The multifunctional laser processing system of claim 1, wherein a discharge port of the at least one feeding hole is directed toward the work piece.

* * * * *